United States Patent [19]
Fujitani et al.

[11] Patent Number: 4,727,653
[45] Date of Patent: Mar. 1, 1988

[54] COORDINATE MEASURING INSTRUMENT

[75] Inventors: Matusiro Fujitani, Kawasaki; Hideo Takaku, Tokyo; Yukiji Yoda, Kawasaki, all of Japan

[73] Assignee: Mitutoyo Mfg. Co., Ltd., Tokyo, Japan

[21] Appl. No.: 917,942

[22] PCT Filed: Jan. 22, 1986

[86] PCT No.: PCT/JP86/00023

§ 371 Date: Sep. 19, 1986

§ 102(e) Date: Sep. 19, 1986

[87] PCT Pub. No.: WO86/04407

PCT Pub. Date: Jul. 31, 1986

[30] Foreign Application Priority Data

Jan. 22, 1985 [JP] Japan ................................ 60-7546
Jan. 25, 1985 [JP] Japan ................................ 60-12249

[51] Int. Cl.$^4$ .......................... G01B 5/03; G01B 7/03
[52] U.S. Cl. ........................................ 33/503; 33/1 M
[58] Field of Search ................ 33/503, 504, 505, 1 M

[56] References Cited

U.S. PATENT DOCUMENTS

| | | |
|---|---|---|
| 349,501 | 7/1873 | Wieg . |
| 2,620,256 | 10/1951 | Kerns et al. . |
| 3,241,243 | 3/1966 | Speer . |
| 3,639,993 | 2/1972 | Sartorio . |
| 3,774,311 | 11/1973 | Stemple . |
| 3,840,993 | 10/1974 | Shelton . |
| 4,155,173 | 5/1979 | Sprandel . |
| 4,175,327 | 11/1979 | Herzog . |
| 4,315,371 | 2/1982 | Kotani et al. . |
| 4,442,607 | 4/1984 | Sakata et al. . |
| 4,495,703 | 1/1985 | Sakata et al. ................ 33/1 M X |
| 4,551,919 | 11/1985 | Sakata et al. . |
| 4,594,791 | 6/1986 | Brandstetter ................ 33/503 |
| 4,610,089 | 9/1986 | Bell et al. ................ 33/503 X |
| 4,630,374 | 12/1986 | Raleigh . |

FOREIGN PATENT DOCUMENTS

| | | |
|---|---|---|
| 575799 | 4/1933 | Fed. Rep. of Germany . |
| 852898 | 10/1952 | Fed. Rep. of Germany . |
| 870625 | 3/1953 | Fed. Rep. of Germany . |
| 2247225 | 3/1974 | Fed. Rep. of Germany . |
| 2546544 | 5/1976 | Fed. Rep. of Germany . |
| 2744687 | 4/1978 | Fed. Rep. of Germany . |
| 55-69008 | 5/1980 | Japan . |
| 56-125608 | 10/1981 | Japan . |
| 1599758 | 10/1981 | United Kingdom . |
| 2179452 | 3/1987 | United Kingdom . |
| 518161 | 9/1976 | U.S.S.R. . |
| 621955 | 12/1977 | U.S.S.R. . |

*Primary Examiner*—Harry N. Haroian
*Attorney, Agent, or Firm*—Parkhurst & Oliff

[57] ABSTRACT

A coordinate measuring instrument, wherein a measuring element support member (1) having a measuring element (2) is movably supported on a mount plate (3), this measuring element (2) is abutted against the surface and the like of a work to be measured, which is mounted on the mount plate (3), and relative movement values between this measuring element (2) and the work are detected to measure a configuration and the like of the work. In this measuring instrument, vertical surfaces (3A, 3B, 50A and 50B) are formed on the mount plate (30) and air bearings (47, 52 and 53) opposed to these vertical surfaces are provided on legs (8 and 9) of the measuring element support member (1), so that the measuring element support member (1) can be regulated in its position in a direction of X-axis.

10 Claims, 13 Drawing Figures

COORDINATE MEASURING INSTRUMENT

TECHNICAL FIELD

This invention relates to coordinate measuring instrument including a two-dimensional and a tridimensional measuring instruments for measuring a configuration and the like of a work to be measured by movements of a measuring element relative to a mount plate mounted thereon with the work, and more particularly to a coordinate measuring instrument, in which relative movement guide of a measuring element support member to the mount plate is improved.

BACKGROUND ART

There has heretofore been known a coordinate measuring instrument, wherein a measuring instrument is moved relative to a work to be measured, which is mounted on a mount plate, and a configuration and the like of the work are measured from relative displacement values of this measuring element. The coordinate measuring instruments of the type described are widely used in various fields of industries for displaying the advantages in raising the measuring accuracy, improving the operating efficiency of measurement and the like.

FIG. 1 shows a conventional coordinate measuring instrument. This coordinate measuring instrument is a tridimensional measuring instrument of the type, wherein a mount plate is fixed and the measuring element is movable. A gate-shaped measuring element support member 103 constituting a moving mechanism is mounted on a mount plate 102 rested on a base 100. This measuring element support member 103 comprises: a right and a left supports 104 and 105; a transverse member 106 transversely racked across top portions of these supports 104 and 105 in a direction of X-axis; a slider 107 provided in a manner to be movable along the transverse member 106; and a spindle 108 provided in a manner to be movable in a direction perpendicular to the slider 107, i.e. a direction of Z-axis. A measuring element 109 is secured to the bottom end of this spindle 108.

Movement of the measuring element 109 in a direction of Y-axis is performed due to the movement of the measuring element support member 103 along a guide rail member 110 affixed to the top surface of the mount plate 102, movement of the measuring element 109 in the direction of X-axis is performed due to the movement of the slider 107 along the transverse member 106, and further, movement of the measuring element 109 in the direction of Z-axis is performed due to the movement of the spindle 108 in the vertical direction. The guide rail member 110 is secured thereto with a detector 111 for the direction of Y-axis. A displacement value in the direction of Y-axis of the measuring element 109 due to the movement of the measuring element support member 103 along the guide rail member 110 is detected by this detector 111, a displacement value in the direction of X-axis of the measuring element 109 due to the movement of the slider 107 is detected by a detector 112 secured to the transverse member 106, and further, a displacement value in the direction of Z-axis of the measuring element 109 due to the vertical movement of the spindle 108 is detected by a detector 113 secured to the slider 107. The work to be measured is rested on and affixed to the top surface of the mount plate 102, whereby the measuring element 109 is brought into contact with the surface of the work and moved tridimensionally, so that the configuration and the like of the work can be measured.

In the conventional technique shown in FIG. 1, since the guide rail member 110 as being the reference of guide in the direction of Y-axis is secured to the top surface of the mount plate 102, troublesome assembling and adjusting works for securing the mounting accuracy of the guide rail member 110 are required, and the effective area of the top surface of the mount plate 102 is restricted by the guide rail, member 110, whereby the size of the work to be rested on the mount plate 102 is restricted. There have been such disadvantages that, since the guide rail member 110 becomes an obstacle to the work, when the work is carried onto the mount plate, only after the direction of the work is changed, the work can be mounted on the top surface of the mount plate 102, and that the height of the measuring element support member 103 is increased due to the height of the guide rail member 110, so that the height of the tridimensional measuring instrument is increased generally.

In addition to the above, it is difficult to operate the tridimensional measuring instrument from the side where the guide rail member 110 is provided, whereby the operating position is restricted. When the detector 111 is secured to the guide rail member 110 as shown in FIG. 1, there is a possibility that this detector 111 is contaminated or damaged during the operation of mounting the work onto the mount plate 102, thus presenting the disadvantage about the safety of the detector 111. The gate-shaped measuring element support member 103 is merely rested on the mount plate 102, whereby, when an external force acts sideways on the measuring element support member 103, there has a possibility that the element measuring support member 103 turns over.

According to the above-described conventional technique, when a left leg 103A and a right leg 103B of the measuring element support member 103 are provided with air bearings, respectively, so as to move the measuring element support member 103 relative to the mount plate 102, if the slider 107 is moved along the transverse member 106 and this movement is stopped at a position close to either the left support 104 or the right support 105, then the measuring element support member 103 is inclined and rotated about an axis parallel to the direction of Y-axis due to the fluctuations in the position of the center of gravity of the measuring element support member 103, whereby the measuring element 109 is varied in posture and an error occurs in a measured result of the work. When it is tried to obviate the disadvantages described above by the raise of air pressure, the measuring element support member 103 is increased in its floating value from the mounting plate 102, whereby the measuring element support member 103 becomes unstable, thus unabling to obviate the disadvantages.

The present invention has been developed to obviate the above-described disadvantages of the prior art, and is based on that, since the top surface of the mount plate is finished to be smooth and horizontal for resting thereon the work in particular, it is relatively easy that other surfaces are finished with high accuracy, securing the perpendicularity thereof with the top surface.

The present invention has as its object the provision of a coordinate measuring instrument, wherein, the mount plate itself is formed to provide the guide reference surface for the movement of the measuring element support member, whereby the provision of the guide rail member on the mount plate is dispensed with, so that the workabilities in assembling, adjustment and the like are improved, the effective area of the top surface of the mount plate is enlarged, the operation of mounting the work is facilitated and the controllability and the like of the measuring instrument are bettered. Moreover, the legs of the moving mechanism holding the measuring element as the measuring element support member are provided with air bearings opposed to vertical surfaces formed on the mount plate, whereby resistance against an external force in the traverse direction is generated in the measuring element support member, so that a possibility that the measuring element support member turns over can be eliminated.

SUMMARY OF THE INVENTION

To achieve the above-described object, the present invention contemplates that, in a coordinate measuring instrument, wherein a work to be measured, which is mounted on the mount plate, and a measuring element held by a moving mechanism are moved relative to each other at least in two directions of axes perpendicularly intersecting each other out of the directions of X-, Y- and Z-axes, and a configuration and the like of the work are measured from relative displacement values, the mount plate is formed of a stone material being rectangular in vertical section and the top surface thereof is made horizontal, this mount plate is provided over a base, with a space formed therebetween, and position regulating means in the direction of X-axis, which are formed on the mount plate and opposed to two vertical surfaces parallel to each other and extending in the direction of Y-axis are provided on both legs of the moving mechanism, respectively, so that these legs are made movable relative to the mount plate.

BEST MODE FOR WORKING THE INVENTION

Figure 2:
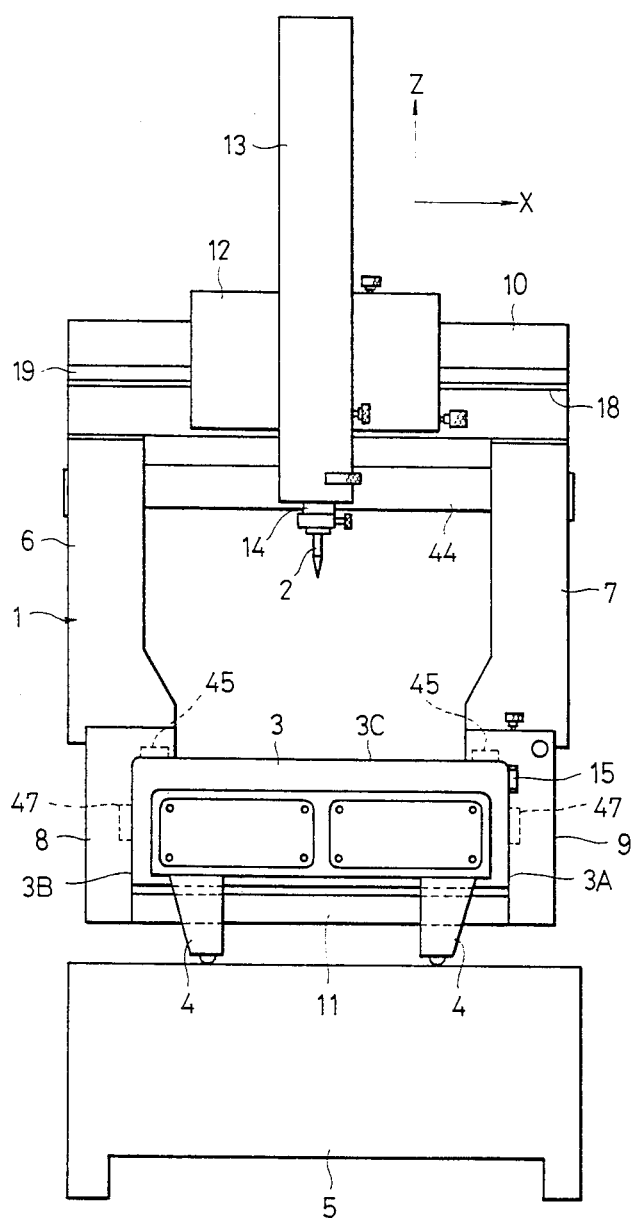
FIG. 2 is a front view showing a first embodiment of the coordinate measuring instrument according to the present invention.
Figure 3:
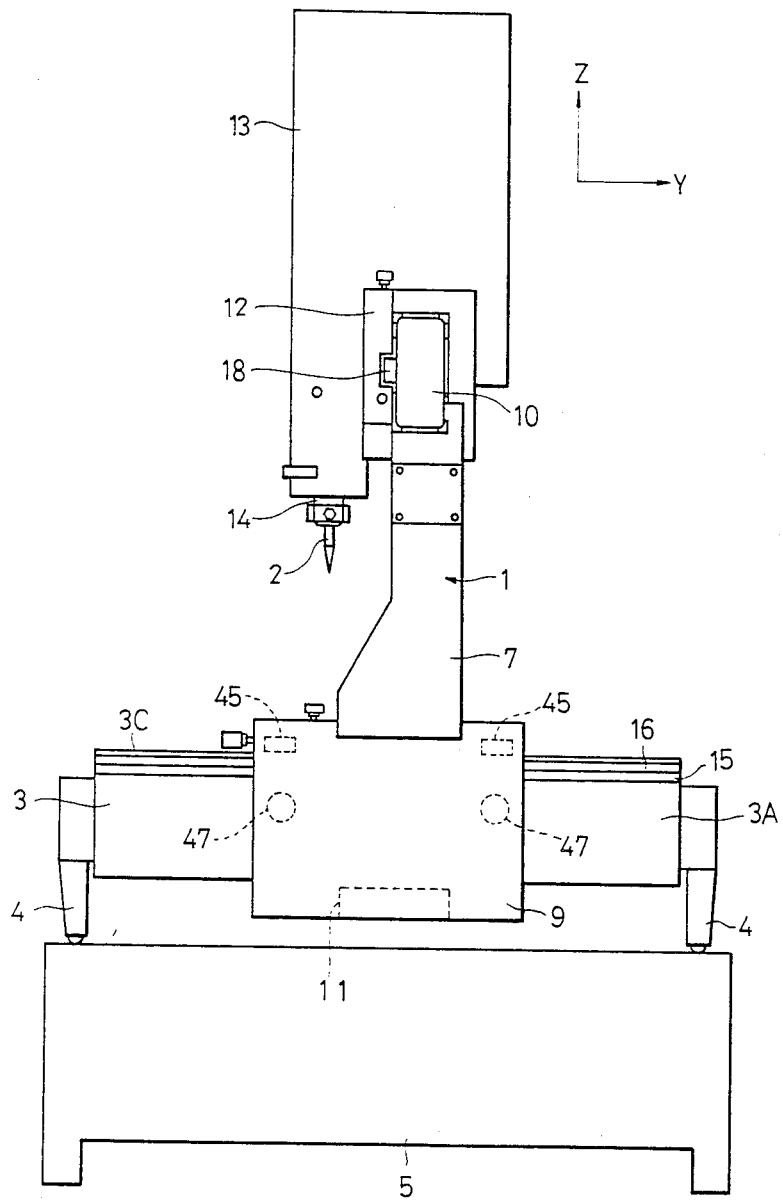
FIG. 3 is a side view of FIG. 2.

FIG. 2 is the front view showing the coordinate measuring instrument according to the first embodiment and FIG. 3 is the side view thereof. This coordinate measuring instrument is a tridimensional measuring instrument. A measuring element support member 1 constitutes a mechanism for moving a measuring element 2 in directions of X-, Y- and Z-axes, and disposed therein with a mount plate 3. As shown in FIG. 2, the mount plate 3 is provided at opposite sides in the longitudinal direction thereof with support members 4, respectively. The mount plate 3 is mounted through these support members 4 on a base 5, with a space being formed therebetween.

As shown in FIG. 2, the measuring element support member 1 comprises: a left and a right supports 6 and 7; legs 8 and 9, which are integrally connected to the bottoms of the supports 6 and 7; a transverse member 10 racked across the tops of the supports 6 and 7 in the direction of X-axis and a connecting member 11 inserted through the space formed between the mount plate 3 and the base 5, for connecting the legs 8 and 9 to each other. In consequence, the measuring element support member 1 having a front shape being of a generally square frame, surrounding the mount plate 3. In this embodiment, the transverse member 10 is formed of a stone material and slidably mounted thereon with a slider 12. A spindle 14 is received in a case 13 integrally formed on the slider 12 in a manner to be movable in the direction of Z-axis, i.e. the vertical direction, and the measuring element 2 is secured to the bottom end of this spindle 14.

The legs 8 and 9 move relative to the mount plate 3, whereby the measuring element 2 is moved in the direction of Y-axis. The slider 12 moves along the transverse member 10, whereby the measuring element 2 is moved in the direction of X-axis. The spindle 14 moves in the vertical direction, whereby the measuring element 2 is moved in the direction of Z-axis.

Figure 4:
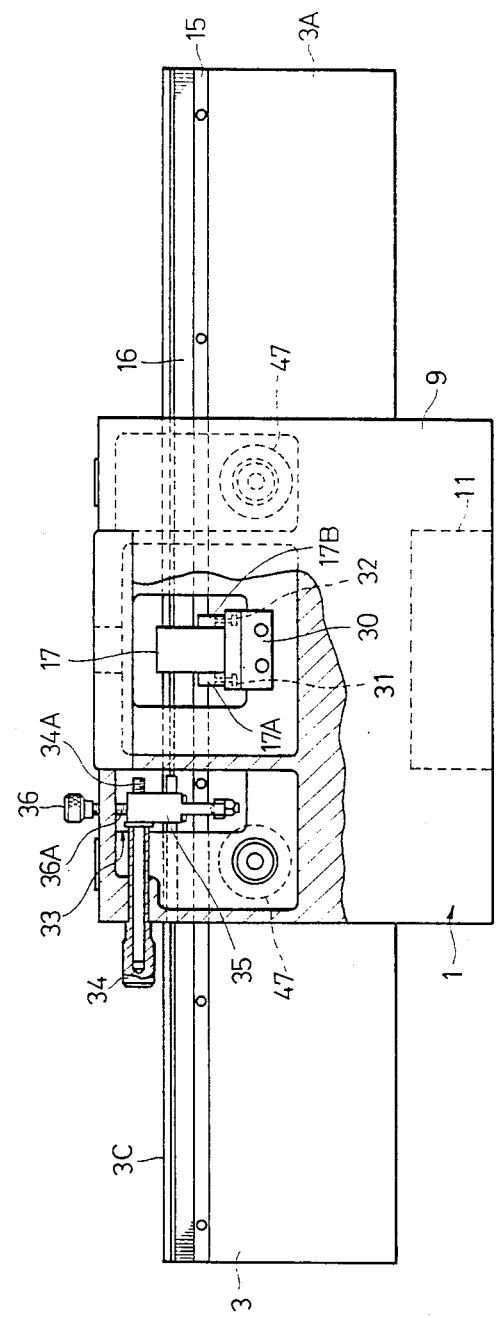
FIG. 4 is an enlarged, partially sectional view of FIG. 3.

A raised member 15 extending in the longitudinal direction of the mount plate 3 is provided on a right side surface 3A of the mount plate 3 in FIG. 2, and a main scale 16 is secured to this raised member 15 as shown in FIG. 3. The main scale 16 and a scale body 17 secured to the leg 9 constitute an optical detector as shown in FIG. 4. The scale body 17 incorporates therein an index scale opposed to the main scale 16, a light emitting element, a light receiving element and the like. When the leg 9 moves right and left in FIG. 3, a light emitted from the light emitting element is turned into an optical wave form by the main scale 16 and the index scale and received by the light receiving element. The optical wave form thus received is converted into an electric signal, whereby a movement value of the leg 9 in the direction of Y-axis, i.e. a displacement value of the measuring element 2 in the direction of Y-axis can be measured.

Figure 6:
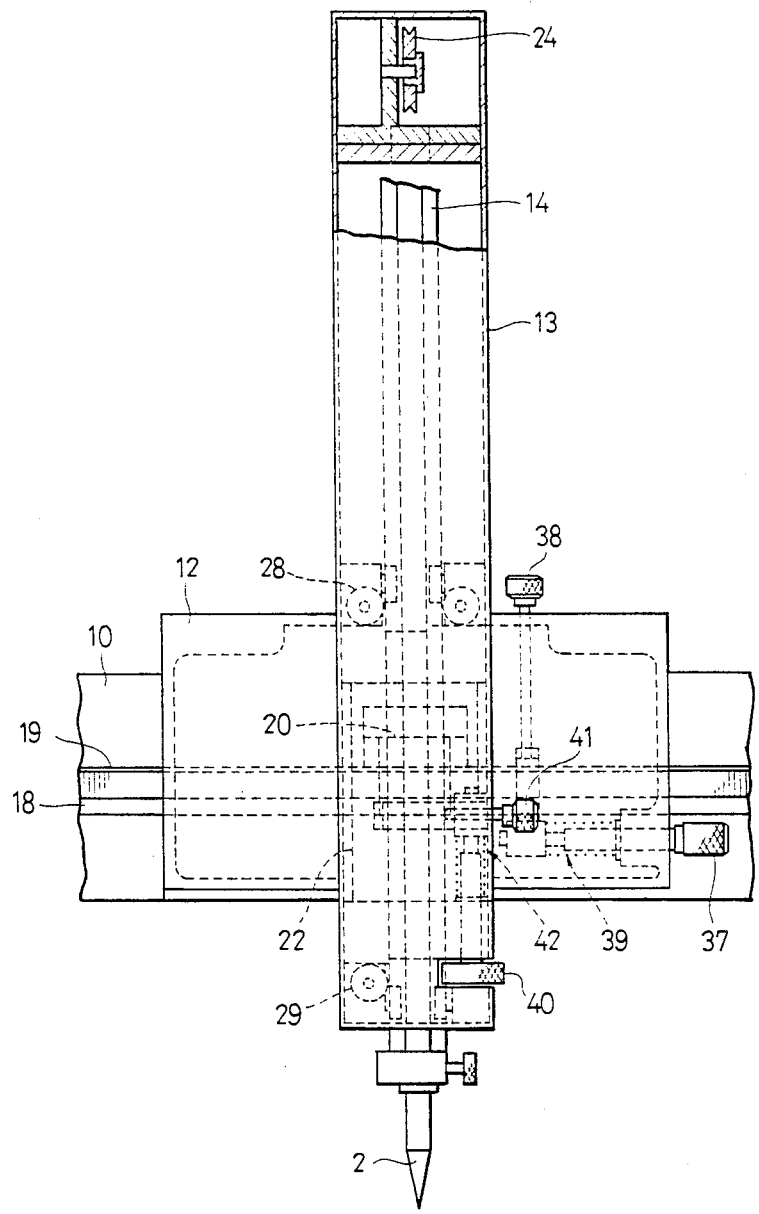
FIG. 6 is a partially enlarged, sectional view of FIG. 2.
Figure 7:
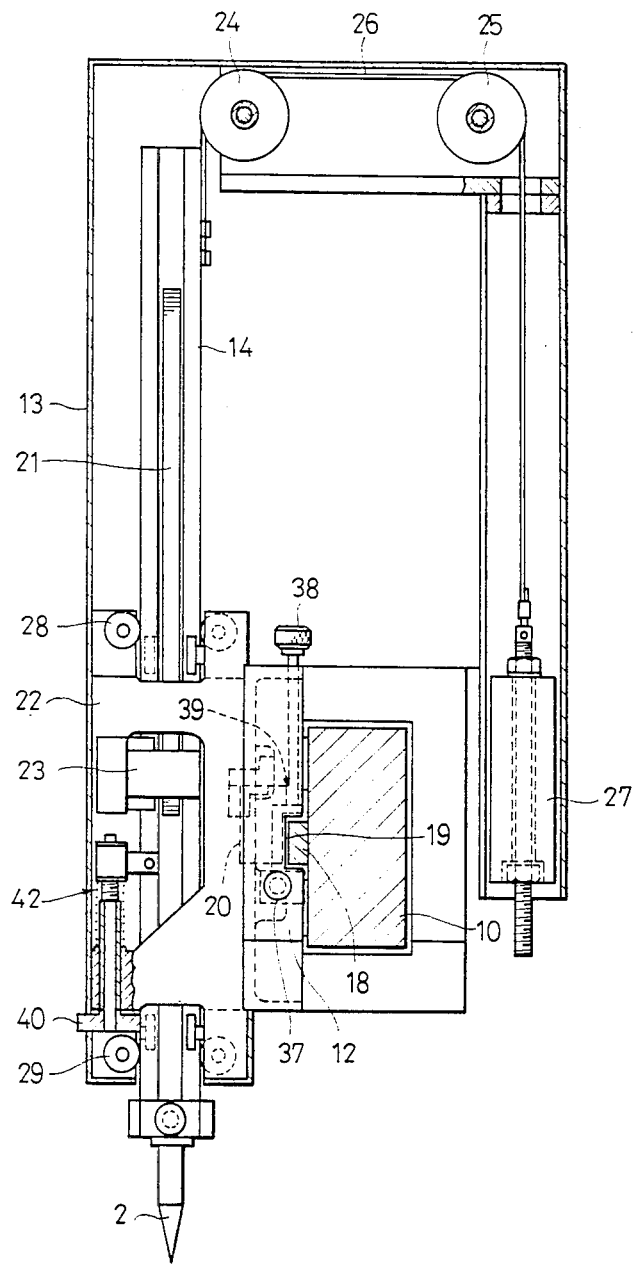
FIG. 7 is a sectional side view of FIG. 6.
Figure 8:
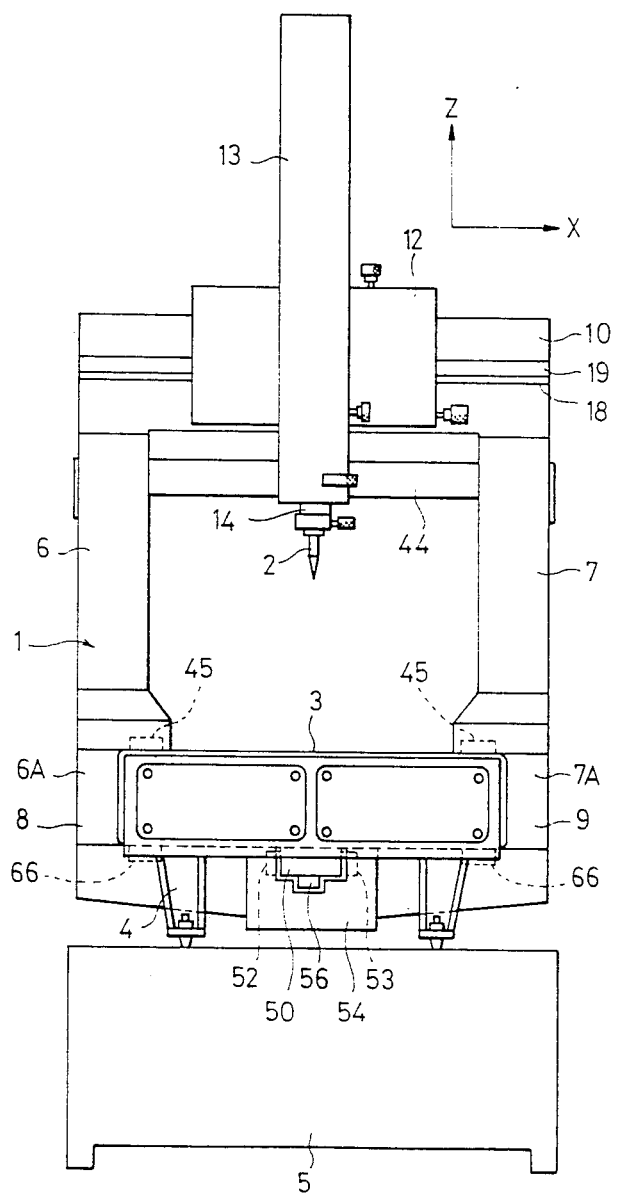
FIG. 8 is a front view showing the coordinate measuring instrument according to a second embodiment of the present invention.
Figure 9:
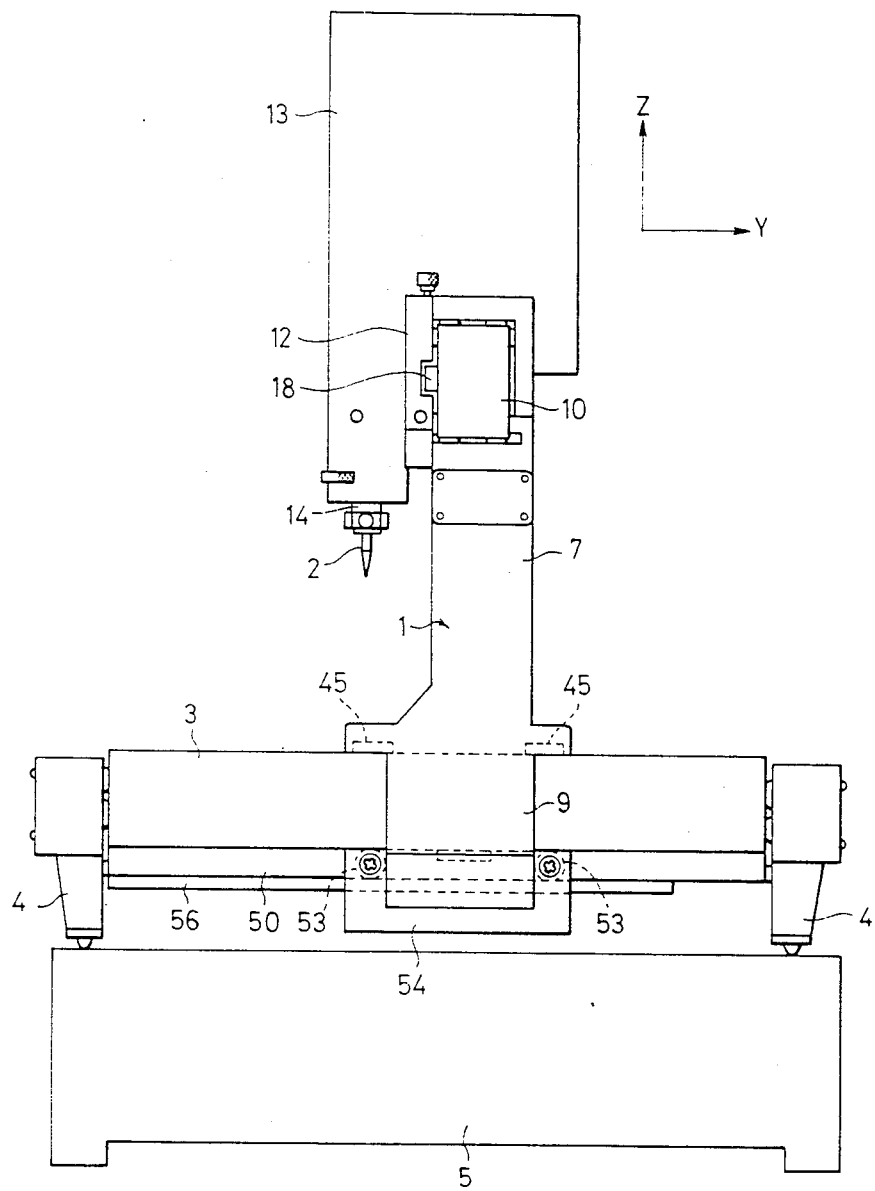
FIG. 9 is a side view thereof.

As shown in FIG. 6, a raised member 18 is secured to the transverse member 10. A main scale 19 secured to this raised member 18 and a scale body 20 provided on the slider 12 constitute a detector in the direction of X-axis having a construction similar to the above, whereby a displacement value in the direction of X-axis of the measuring element 2 due to the movement of the slider 12 along the transverse member 10 is measured by this detector. As shown in FIG. 7, a main scale 21 is secured to a side surface of the spindle 14. A block 22 is received and fixed into the case 13 integrally formed on the slider 12. A scale body 23 is provided in the block 22. The main scale 21 and the scale body 23 constitute a detector in the direction of Z-axis having a construction similar to the above. A displacement value in the direction of Z-axis of the measuring element 2 is detected by this detector due to the vertical movement of the spindle 14.

The spindle 14 is connected thereto with one end of a wire 26 running by guided by rollers 24 and 25, a balance weight 27 is connected to the other end of the wire 26, and the weight of the spindle 14 is supported by the balance weight 27. Two groups of rollers 28 and 29 are provided above and below the block 22, whereby the spindle 14 is moved in the vertical direction through the rotary guide action of the groups of rollers 28 and 29.

To obviate the measuring errors, the scale body 17 shown in FIG. 4 is adjustable in its posture of inclination to the main scale 16. This adjustment will now be described in detail. The leg 9 is affixed thereto with a bracket 30, to which the scale body 17 is tightened and affixed through a locking bolt, not shown. Two screws 31 and 32 are threaded into the bracket 30. These screws 31 and 32 are brought into abutting contact with stepped portions of two side portions 17A and 17B of the scale body 17. When the locking bolt is loosened and the screws 31 and 32 are linearly moved through rotating operation, the scale body 17 is rotated about an axial line passing through a direction perpendicularly intersecting a paper surface of FIG. 4, so that an angle of posture of the scale body 17 relative to the main scale 16 can be adjusted. Each of the adjusting mechanisms similar to the above is provided with each of the scale bodies 20 and 23 for detecting in the directions of X-axis and Y-axis as shown in FIGS. 6 and 7.

Figure 5:
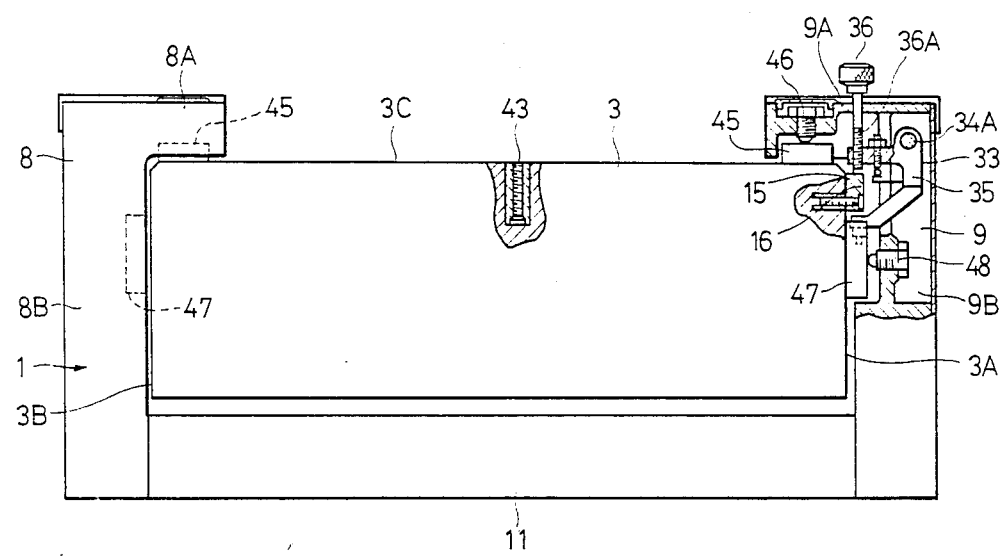
FIG. 5 is a partially sectional front view of FIG. 4.

Movements of the measuring element 2 in the respective directions of X-, Y- and Z-axes are performed through operations of pushing the measuring element support member 1 and the like. As shown in FIG. 4, the leg 9 is provided with a mechanism 33 for finely moving the leg 9 in the direction of Y-axis. As shown in FIGS. 4 and 5, this finely moving mechanism 33 comprises: a fine movement knob 34 rotatably secured to a predetermined position of the leg 9; a generally U-shaped clamper member 35 capable of rocking about a screw rod 34A of the fine movement knob 34; and a clamp knob 36 whose screw rod 36A is threaded into one end of this clamper member 35. The clamp knob 36 is rotated to clamp the raised member 15 between the bottom end of the screw rod 36A and the other end of the clamper member 35, whereby the clamper member 35 is integrated with the mount plate 3. When the fine movement knob 34 is rotated in this state, feeding action occurs between the screw rod 34A and the clamper member 35, into which this screw rod 34A is threaded, with the result that the leg 9, and in its turn, the measuring element support member 1 is finely moved relative to the mount plate 3 in the direction of Y-axis.

As shown in FIGS. 6 and 7, each of the finely moving mechanisms 39 and 42 in the direction of X-axis and Z-axis, which comprise the fine movement knobs 37 and 40, the clamp knobs 38 and 41 and the like similar to the above, are provided on the slider 12 and the case 13, respectively.

The side surfaces 3A, 3B to the left and right and the top surface 3C of the mount plate 3 as being the stone surface plate as shown in FIG. 5 are finished with high accuracy, and the respective plane accuracies thereof are secured, the top surface 3C is made horizontal and the side surfaces 3A, 3B are formed into vertical surfaces constituting guide reference surfaces in the direction of Y-axis, and the rectangularness of the side surfaces 3A, 3B to the top surface 3C is secured highly. In this embodiment, the top surface 3C of the mount plate 3 is formed with a threaded hole 43 to be utilized for fixing the work to be measured, which is mounted on the top surface 3C. Furthermore, as shown in FIG. 2, a connecting bar 44 is racked across the left and right supports 6 and 7 to connect the supports 6 and 7 to each other, whereby the measuring element support member 1 is improved in its strength, so that an error in measuring due to deformation of the measuring element support member 1 can be prevented from occurring.

As shown in FIG. 5, each of the left and right legs 8 and 9 is formed into an inverted L-shape in looking from the front, and these legs 8 and 9 have top portions 8A and 9A and side portions 8B and 9B, which are opposed to the top surface 3C and the side portions 3A and 3B of the mount plate 3, respectively.

Top air bearings 45 are provided in the top portions 8A and 9A of the legs 8 and 9, respectively. These top air bearings 45 are opposed to the top surface 3C of the mount plate 3, while being pressed by forward end semispherical portions of cap screws 46, respectively. Side air bearing 47 constituting means for regulating the positions in the direction of X-axis of the measuring element support member 1 are provided in the side portions 8B and 9B of the legs 8 and 9, respectively. These side air bearings 47 are also opposed to the side surfaces 3A and 3B of the mount plate 3, which being pressed by forward end semispherical portions of cap screws 48, respectively. Respective two pairs of the top air bearings 45 and the side air bearings 47 are disposed on both sides of the legs 8 and 9 in the longitudinal direction of the mount plate 3.

Figure 1:
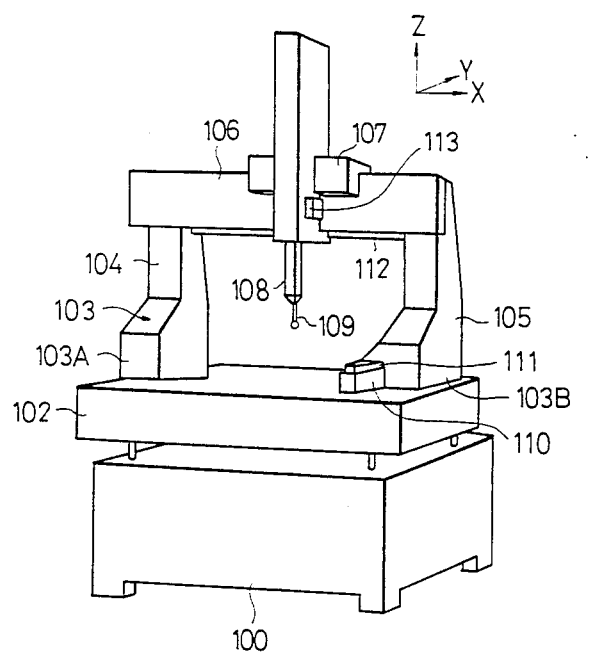
FIG. 1 is a perspective view showing a conventional example of the coordinate measuring instrument.

Air blows out from the top air bearings 45 and the side air bearings 47, whereby the measuring element support member 1 is made slidable on the mount plate 3, so that the measuring element support member 1 can move in the direction of Y-axis. At this time, in the tridimensional measuring instrument, movement of the measuring element support member 1 in the direction of Y-axis is performed by utilizing the side surfaces 3A and 3B of the mount plate 3 as the guide surfaces. More specifically, the measuring element support member 1 is moved by utilizing the mount plate 3 itself as the guide member. Since the top surface 3C of the mount plate 3 is precision-finished for mounting the work, it is relatively easy that the side surfaces 3A and 3B are subjected to flat work, with the perpendicularity of these side surfaces 3A and 3B being maintained at high accuracy. In consequence, such troublesome works can be dispensed with that the guide rail members are secured to the top surface of the mount plate, with the parallelism and the like being secured, and so on, as in the conventional technique shown in FIG. 1.

When the top air bearings 45 and the side air bearings 47 blow out air, the legs 8 and 9 tend to expand outwardly to the left and right in FIGS. 2 and 5 due to the reaction force of air blow-out from the side air bearings 47. However, as aforesaid, the legs 8 and 9 are connected to each other through the connecting member 11, so that this expansion can be avoided.

As described above, in the tridimensional measuring instrument, since no guide rail is provided on the top surface 3C of the mount plate 3, the whole surface of the top surface 3C can be used as the surface for mounting thereon the work. More specifically, the effective area of the top surface 3C of the mount plate 3 is enlarged, so that a large-sized work to be measured can be mounted thereon. Furthermore, when the work is mounted onto the top surface 3C of the mount plate 3, there is no obstacle such as the guide rail member and the like on the top surface 3C, whereby there is no need of changing the direction of the work, so that the work as it is can be disposed on the top surface 3C of the mount plate 3, thus facilitating the carry-in and carry-out operations of the work. Further, there is no guide rail member protruding upwardly from the top surface 3C of the mount plate 3, whereby the height of the measuring element support member 1 can be reduced accordingly, so that the height of the tridimensional measuring instrument can be decreased.

Since the guide rail member is not used, either the left or right side of the mount plate 3 in FIGS. 2 and 5 is in the opened state, so that the tridimensional measuring instrument can be operated not only from the front but also both the right and left sides of the mount plate 3, thus improving the controllability. In this embodiment, the main scale 16 constituting the detector in the direction of Y-axis is provided on the side surface 3A of the mount plate 3, whereby, when the work is carried in or out of the top surface 3C of the mount plate 3, possibilities that this main scale 16 is contaminated or damaged are reduced, so that the detector can be held in safety.

In addition to the above, in the tridimensional measuring instrument, the top air bearings 45 and the side air bearings 47, which are opposed to the top surface 3C and the side surfaces 3A and 3B of the mount plate 3, respectively, are provided in the legs 8 and 9 of the measuring element support member 1, and the legs 8 and 9 have the construction of embracing the mount plate 3 from the top and the sides thereof, so that, even if an external force in the lateral direction acts on the measuring element support member 1, this external force can be effectively supported by the side portions 8B and 9B of the legs 8 and 9, thereby preventing the measuring element support member 1 from turning over.

Description will hereunder be given of the second embodiment. In this embodiment, same reference numerals are used to designate same or similar parts corresponding to ones as shown in the first embodiment, so that the description will be omitted or simplified.

This second embodiment features that, differing from the embodiment, wherein the vertical surfaces each constituting the guide reference surface in the direction of Y-axis are provided on the side surfaces of the mount plate 3, vertical surface 50A and 50B are formed on a bottom rail 50 provided on the undersurface of the mount plate 3, air bearings 52 and 53, which are opposed to extended surface of 50A and 50B of these vertical surfaces, are provided on the connecting member 54, and further, position regulating means in the direction of Z-axis is provided.

Figure 10:
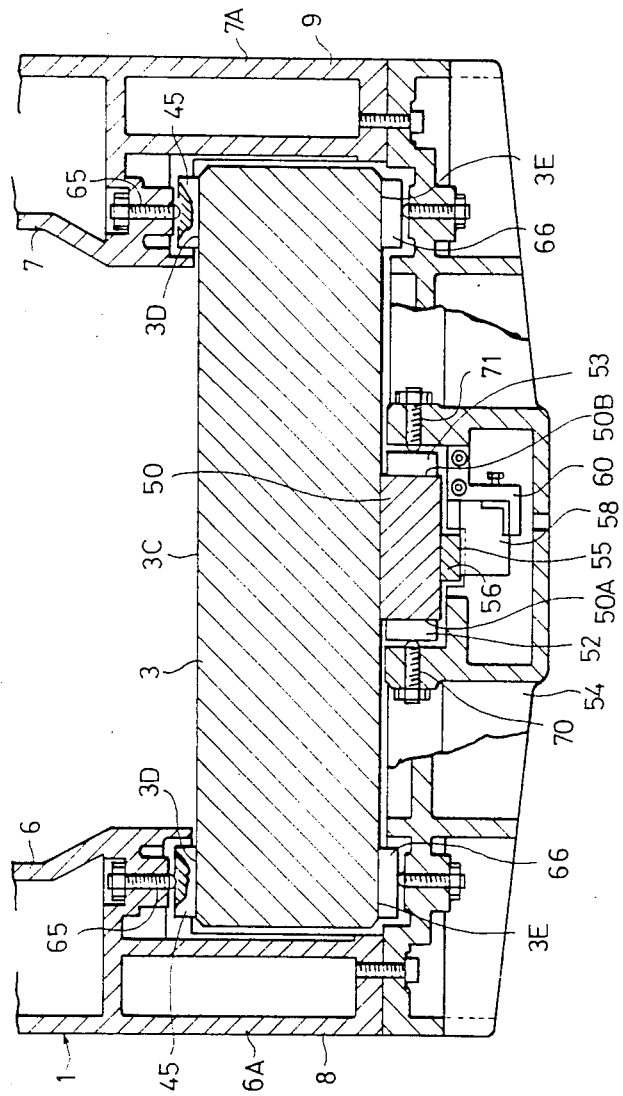
FIG. 10 is a partially enlarged, sectional view of FIG. 8.

Referring to FIGS. 8 through 13 showing the second embodiment, the bottom rail 50 is secured to the central portion in the direction of X-axis on the undersurface of the mount plate 3, this bottom rail 50 extends in the longitudinal direction of the mount plate 3, i.e. the direction of Y-axis, and has a length equal to the mount plate 3. In this embodiment, the bottom rail 50 is made of a stone material similarly to the mount plate 3, consequently, may be formed separately of the mount plate 3 as shown, or formed integrally with the mount plate 3. As shown in FIG. 10, a raised member 56 provided thereon with a main scale 55 is secured to the undersurface of the bottom rail 50, and both the main scale 55 and the raised member 56 extend in the direction of Y-axis.

The main scale 55 and a scale body 58 secured to the connecting member 54 constitute the optical detector in the direction of Y-axis. An index scale opposed to the main scale 55, the light emitting element, the light receiving element and the like are received in the scale body 58, whereby a displacement value of the measuring element 2 in the direction of Y-axis is detected similarly to the preceding embodiment. There is provided stopper means, not shown, for regulating the limit in movement of the measuring element support member 1 in the direction of Y-axis.

Figure 11:
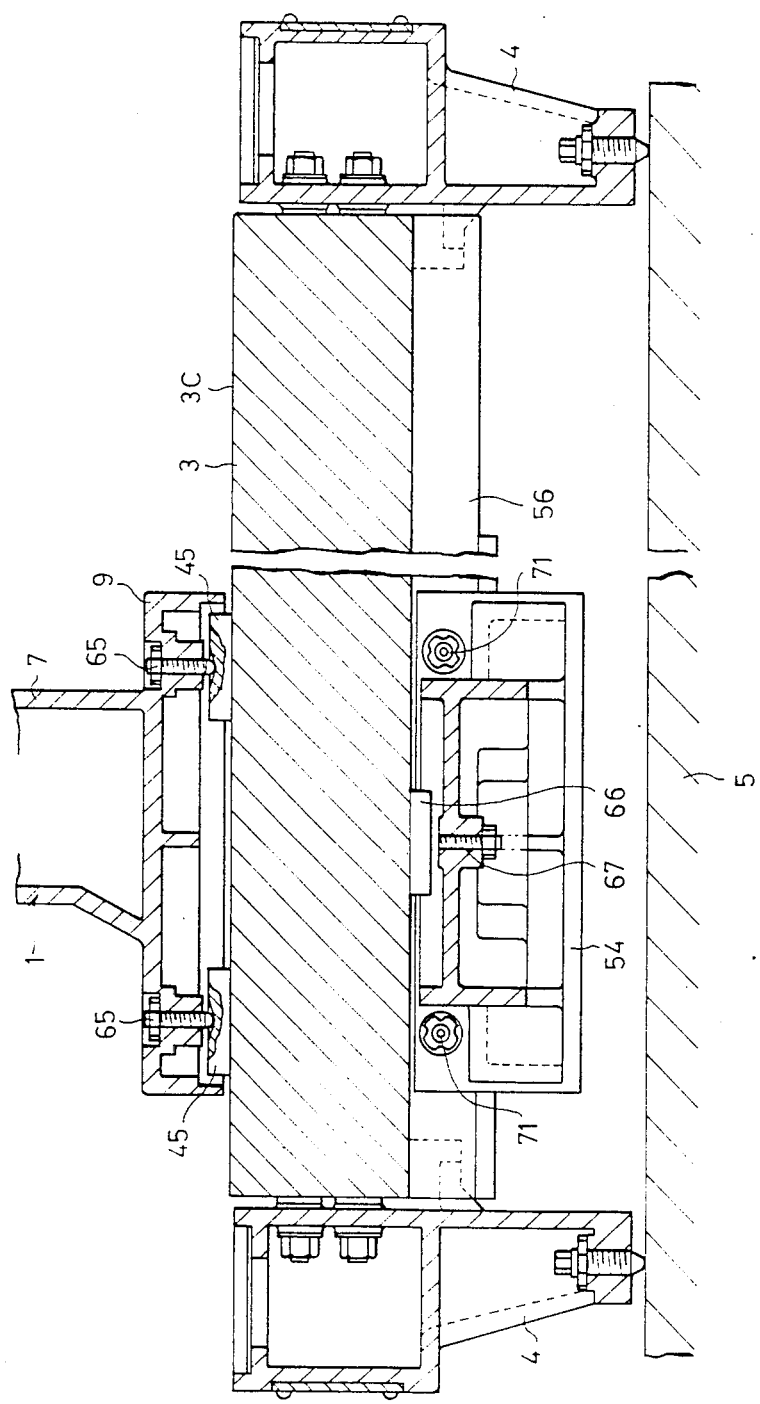
FIG. 11 is a partially enlarged, sectional view of FIG. 9.

For example, this stopper means is formed by securing raised members each being made of an elastic material such as rubber to the left and right side surfaces of the connecting member 54 shown in FIG. 11. The measuring element support member 1 is moved in the direction of Y-axis, whereby this raised member abuts against one of the support members 4, so that the measuring element support member 1 can be limited in its movement in the direction of Y-axis.

Figure 12:
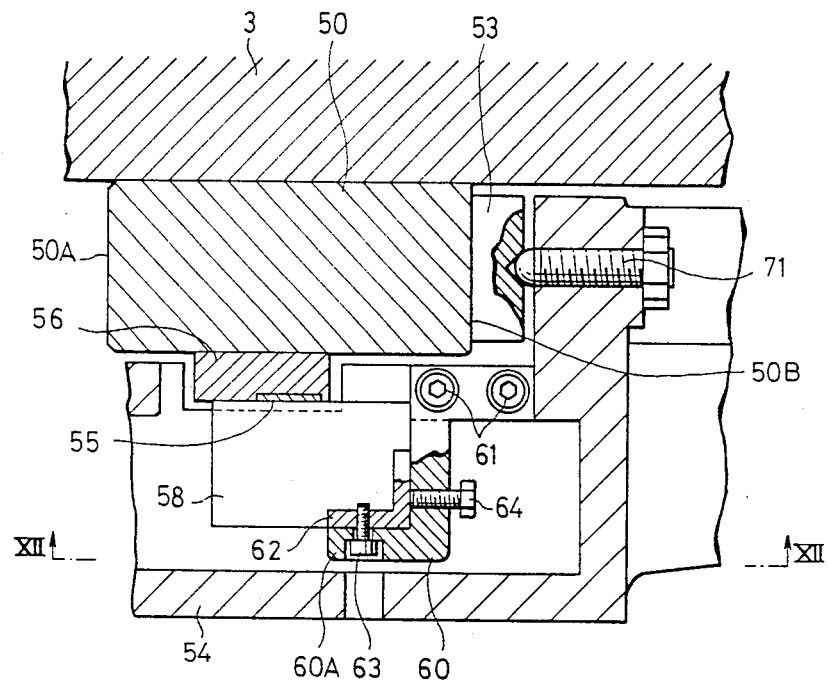
FIG. 12 is a partially enlarged view of FIG. 10.
Figure 13:
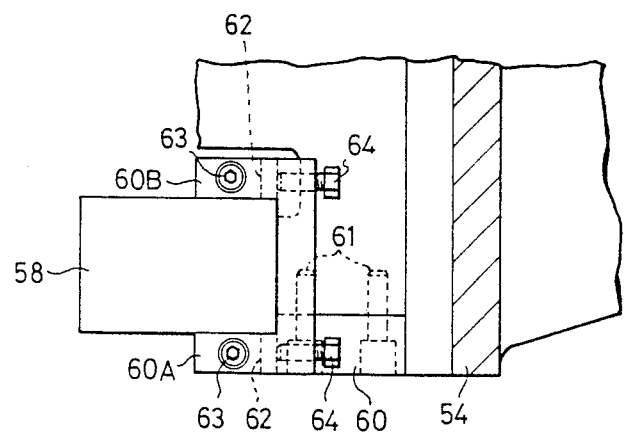
FIG. 13 is a view in the direction indicated by the arrows from line XII—XII in FIG. 12.

In the second embodiment also, the posture of the scale body 58 relative to the main scale 55 can be adjusted through an adjusting mechanism. This posture adjusting mechanism is shown in FIGS. 12 and 13. A bracket 60 is connected to the connecting member 54 through two bolts 61, and this bracket 60 is provided at the bottom portion thereof with two arm portions 60A and 60B spaced apart from each other in the direction of Y-axis as shown in FIG. 13. Mounting members 62 are connected to opposite side surfaces of the scale body 58 in the direction of Y-axis, and these mounting members 62 are tightened and fixed to the arm portions 60A and 60B through screws 63. Adjusting screws 64 are threadably coupled into the bracket 60 at positions opposed to the mounting members 62. When the screws 63 are loosened and the adjusting screws 64 are rotated to move linearly, the scale body 58 is rotated about the vertical axial line in FIG. 12 only for a value commensurate to a clearance formed between the arm portions 60A, 60B and the screws 63, so that the scale body 58 is adjusted in its posture relative to the main scale 55.

Top planar portions 3D are formed on both portions in the direction of X-axis of the top surface 3C of the mount plate 3, and bottom planar portions 3E are formed on both portions in the direction of X-axis of the undersurface. These top planar and bottom planar portions 3D and 3E are formed to provide highly accurate surfaces being parallel to each other.

The top air bearings 45 opposed to the top planar surface 3D in the left and right legs 8 and 9 are pressed by forward end semispherical portion of top bolts 65. In the connecting member 54, which constitutes a moving mechanism together with the measuring element support member 1 and the legs 8 and 9, the bottom air bearings 66 opposed to the bottom planar portions 3E are pressed by top bolts 67. These top air bearings 45 and the bottom air bearings 66 constitute means for regulating the position of the measuring element support member 1 in the direction of Z-axis.

As shown in FIG. 11, the pairs of the top air bearings 45 are provided on the sides of the legs 8 and 9 in the direction of X-axis, and each bottom air bearing 66 is provided in the central portion in the direction of Y-axis.

The vertical surfaces 50A and 50B, which constitute the guide reference surfaces of the bottom rail 50 in the direction of Y-axis, are accurately perpendicular to the top surface 3C of the mount plate 3. The bottom rail 50 may be formed integrally on the mount plate 3.

The side air bearings 52 and 53, which are opposed to the vertical surfaces 50A and 50B, are pressed by tap bolts 70 and 71 in the central portion of the connecting member 54. These side air bearings 52 and 53 constitute means for regulating the position of the measuring element support member 1 in the direction of X-axis and two pairs of the side air bearings 52 and 53 are provided on both sides in the direction of Y-axis.

In order to provide the side air bearings 52 and 53, it becomes necessary to provide a protruded portion between the legs 8 and 9 on the side of undersurface of the mount plate 3 (In this embodiment, the connecting member 54). However, in FIG. 10, the support members 4 for supporting the mount plate 3 on the base 5 are secured to the opposite sides of the mount plate 3 in the direction of Y-axis, whereby, even if the measuring element support member 1 moves in the direction of Y-axis relative to the mount plate 3, the portions where the side air bearings 52 and 53 are provided, are not abutted against anyone of the support members 4.

In this tridimensional measuring instrument, the movement of the measuring element support member in the direction of Y-axis is performed, while the position in the direction of Z-axis thereof being regulated by the top air bearings 45 and the bottom air bearings 66, which are opposed to the top planar portions 3D and the bottom planar portions 3E and in parallel to each other with high accuracy, and the position in the direction of X-axis thereof being regulated by the side air bearings 52 and 53, which are opposed to the vertical surfaces 50A and 50B.

According to the second embodiment as described above, the measuring element support member 1 is positionally invariably provided relative to the mount plate 3 not only in the direction of X-axis but also in the direction of Z-axis, whereby, even when the slider 12 is moved in the direction of X-axis, the slider 12 reaches one end of the transverse member 10 and the measuring element support member 1 is greatly changed in its position of the center of gravity, the measuring element support member 1 can avoid being inclined and rotated, thus adding such an advantage that a measuring error due to a shift in position of the measuring element 2 can be prevented from occurring.

The detectors used in the measuring instrument according to this embodiment as described above have been of the optical encoders, however, these detectors may be of optional types such as magnetic ones. Furthermore, the coordinate measuring instrument in this embodiment has been the tridimensional measuring instrument, however, the present invention is applicable to a two-dimensional measuring instrument, wherein the measuring element moves two-dimensionally on a surface parallel to the top surface of the mount plate. The measuring instrument according to this embodiment has been of the type, wherein the mount plate is affixed and the measuring element is moved relative to the mount plate, however, the present invention is applicable to a measuring instrument of the type, wherein the mount plate is moved relative to the measuring element. In short, any measuring instrument may be used, only if the measuring instrument is of the type, wherein the work, which is mounted on the mount plate, and the measuring element are moved relative to each other.

The position regulating means in the direction of Z-axis and in the direction of X-axis have been constituted by the air bearings, however, these means may be constituted by rollers, for example. More specifically, any optional position regulating means may be used, only if the means are of the types, wherein the measuring element is moved relative to the mount plate, while being regulated in position in the directions of Z and X-axes.

The present invention as described above can provide the coordinate measuring instrument, wherein an effective area on the top surface of the mount plate is enlarged, the workability such as the mounting of the work is bettered, the controllability of the measuring instrument is improved, the hight of the measuring instrument is reduced, further, the measuring element is made to have the resistance against the external forces in the lateral direction, and the possibility that the measuring element support member turns over can be eliminated.

INDUSTRIAL AVAILABILITY

The present invention can be applied generally to the field of measuring industry for measuring the tridimensional configuration and the like of the work.

We claim:

1. A coordinate measuring instrument, wherein a work to be measured, which is mounted on a mount plate, and a measuring element held by a moving mechanism having a pair of legs are moved relative to each other at least in two directions of axes perpendicularly intersecting each other out of the directions of X-, Y- and Z-axes, and configuration and the like are measured from relative displacement values, characterized in that: said mount plate is provided over a base with a space formed therebetween; and position regulating means in the direction of X-axis, which are formed on said mount plate and opposed to two vertical surfaces parallel to each other and extending in the direction of Y-axis are provided on both legs of said moving mechanism, respectively, so that said legs are made movable relative to said mount plate.

2. A coordinate measuring instrument as set forth in claim 1, wherein said mount plate is provided over said base, with the space being formed therebetween through support members.

3. A coordinate measuring instrument as set forth in claim 2, wherein said legs are connected to each other through a connecting member crossing on the undersurface's side of said mount plate.

4. A coordinate measuring instrument as set forth in claim 1, wherein said vertical surfaces are formed on opposite sides of said mount plate.

5. A coordinate measuring instrument as set forth in claim 1, wherein the bottom surface of said mount plate is formed to provide a surface parallel to the top surface thereof and position regulating means in the direction of Z-axis are provided in said both legs.

6. A coordinate measuring instrument as set forth in claim 5, wherein said position regulating means in the direction of Z-axis are formed of air bearings.

7. A coordinate measuring instrument as set forth in claim 1, wherein said position regulating means in the direction of X-axis are formed of air bearings.

8. A coordinate measuring instrument as set forth in claim 1, wherein said vertical surfaces are formed on opposite side surfaces in the direction of X-axis of a rail provided on the undersurface of said mount plate and extending in the direction of Y-axis.

9. A coordinate measuring instrument as set forth in claim 8, wherein a detector for detecting a position of said measuring element in the direction of Y-axis is provided on the undersurface of said rail.

10. A coordinate measuring instrument as set forth in claim 9, wherein: said detector has a main scale and a scale body including an index scale opposed to said main scale and a light emitting element; and said scale body is adjustable in its posture.

* * * * *